US011493625B2

(12) United States Patent
Kumar et al.

(10) Patent No.: US 11,493,625 B2
(45) Date of Patent: Nov. 8, 2022

(54) SIMULATED LIDAR DEVICES AND SYSTEMS

(71) Applicant: NIO Technology (Anhui) Co., Ltd., Hefei (CN)

(72) Inventors: Arun C S Kumar, Milpitas, CA (US); Disha Ahuja, San Jose, CA (US); Ashwath Aithal, Fremont, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 167 days.

(21) Appl. No.: 16/819,557

(22) Filed: Mar. 16, 2020

(65) Prior Publication Data

US 2021/0286068 A1   Sep. 16, 2021

(51) Int. Cl.
| | |
|---|---|
| *G01S 13/89* | (2006.01) |
| *G01S 7/02* | (2006.01) |
| *G01S 13/86* | (2006.01) |
| *G01S 13/931* | (2020.01) |
| *G05D 1/02* | (2020.01) |
| *G01S 13/00* | (2006.01) |

(52) U.S. Cl.
CPC ............... *G01S 13/89* (2013.01); *G01S 7/02* (2013.01); *G01S 13/867* (2013.01); *G01S 13/931* (2013.01); *G05D 1/0257* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,739,881 B1 | 8/2017 | Pavek et al. | |
| 10,678,244 B2* | 6/2020 | Iandola | .................. G06V 20/58 |
| 2007/0013575 A1* | 1/2007 | Lee | ......................... G01S 13/89 |
| | | | 342/52 |
| 2014/0218226 A1* | 8/2014 | Raz | ........................ G01S 13/931 |
| | | | 342/70 |

(Continued)

FOREIGN PATENT DOCUMENTS

CN          107204037          9/2017

OTHER PUBLICATIONS

"Pseudo-LiDAR from Visual Depth Estimation: Bridging the Gap in 3D Object Detection for Autonomous Driving," Proceedings of the IEEE Conference on Computer Vision and Pattern Recognition, Mar. 2019, retrieved from https://patrick-llgc.github.io/Learning-Deep-Learning/paper_notes/pseudo_lidar.html, 3 pages.

(Continued)

*Primary Examiner* — Bernarr E Gregory
(74) *Attorney, Agent, or Firm* — Sheridan Ross P.C.

(57) ABSTRACT

Systems and methods for generating simulated LiDAR data using RADAR and image data are provided. An algorithm is trained using deep-learning techniques such as loss functions to generate simulated LiDAR data using RADAR and image data. Once trained, the algorithm can be implemented in a system, such as a vehicle, equipped with RADAR and image sensors in order to generate simulated LiDAR data describing the system's environment. The simulated LiDAR data may be used by a vehicle control system to determine, generate, and implement modified driving operations.

20 Claims, 11 Drawing Sheets

(56) References Cited

U.S. PATENT DOCUMENTS

| | | | |
|---|---|---|---|
| 2015/0030256 A1* | 1/2015 | Brady | G01S 13/89 382/254 |
| 2015/0192668 A1* | 7/2015 | Mckitterick | G01S 13/89 702/159 |
| 2018/0203445 A1 | 7/2018 | Micks et al. | |
| 2018/0231654 A1 | 8/2018 | Bilik et al. | |
| 2019/0302259 A1* | 10/2019 | Van Fleet | G05D 1/0257 |
| 2019/0303759 A1 | 10/2019 | Farabet et al. | |
| 2020/0074266 A1 | 3/2020 | Peake et al. | |
| 2020/0160598 A1* | 5/2020 | Manivasagam | G07C 5/02 |

OTHER PUBLICATIONS

Godard et al., "Unsupervised Monocular Depth Estimation with Left-Right Consistency," Proceedings of the IEEE Conference on Computer Vision and Pattern Recognition. Apr. 12, 2017, pp. 270-279.

Wang et al., "Pseudo-LiDAR from Visual Depth Estimation: Bridging the Gap in 3D Object Detection for Autonomous Driving,"," Proceedings of the IEEE/CVF Conference on Computer Vision and Pattern Recognition (CVPR), 2019, pp. 8445-8453, retrieved from https://openaccess.thecvf.com/content_CVPR_2019/html/Wang_Pseudo-LiDAR_From_Visual_Depth_Estimation_Bridging_the_Gap_in_3D_CVPR_2019_paper.html.

Weng et al., "Monocular 3D Object Detection with Pseudo-LiDAR Point Cloud." retrieved from https://arxiv.org/pdf/1903.09847.pdf, Aug. 31, 2019, 14 pages.

You et al. "Pseudo-LiDAR++: Accurate Depth for 3D Object Detection in Autonomous Driving." retrieved from https://arxiv.org/pdf/1906.06310v1.pdf, Jun. 14, 2019, 13 pages.

Zhou et al., "Unsupervised Learning of Depth and Ego-Motion from Video." Proceedings of the IEEE Conference on Computer Vision and Pattern Recognition. 2017., paper retrieved from https://openaccess.thecvf.com/content_cvpr_2017/papers/Zhou_Unsupervised_Learning_of_CVPR_2017_paper.pdf, pp. 1851-1860.

International Search Report and Written Opinion for International (PCT) Patent Application No. PCT/US2021/022569, dated Jun. 3, 2021 12 pages.

* cited by examiner

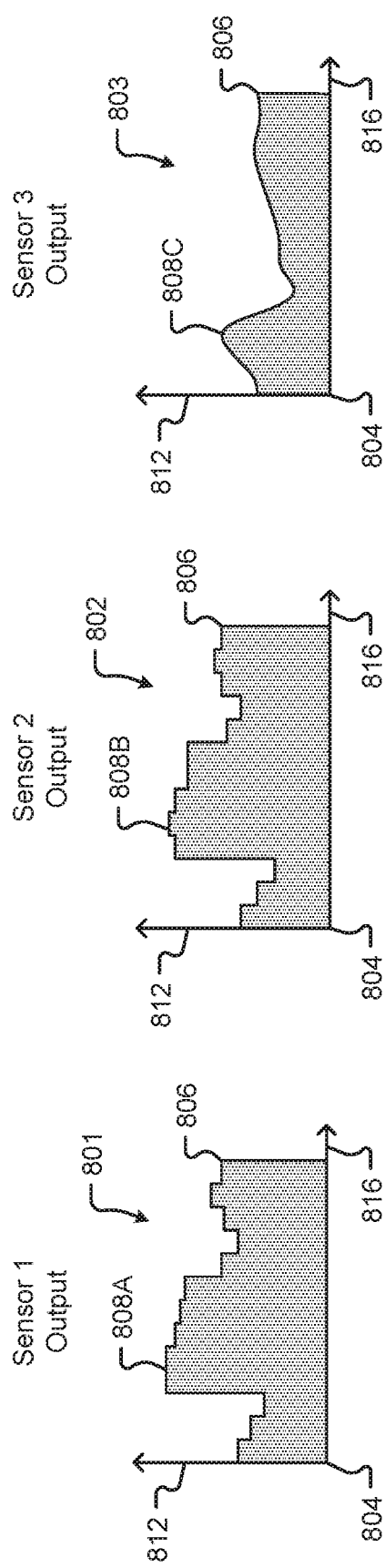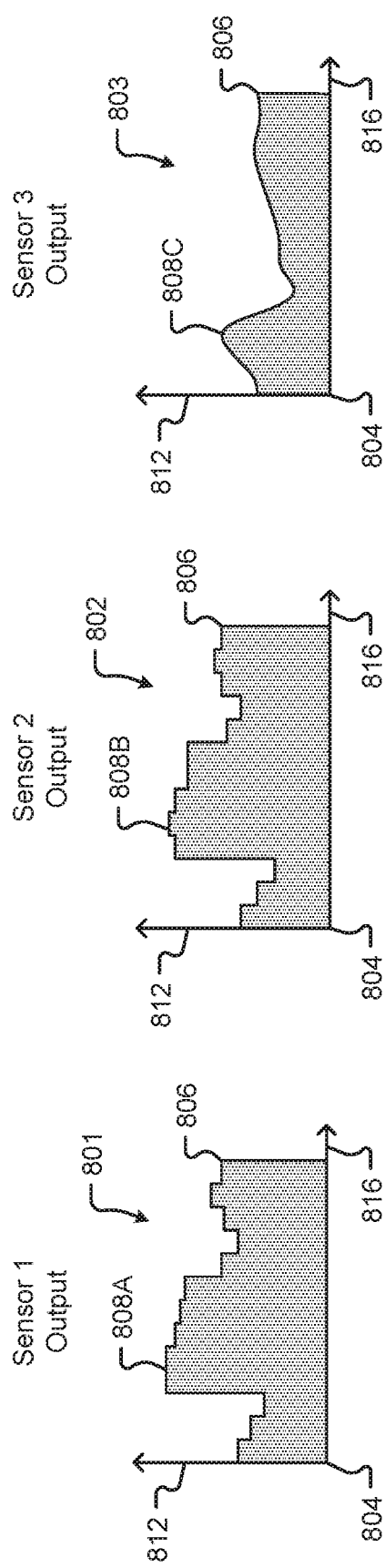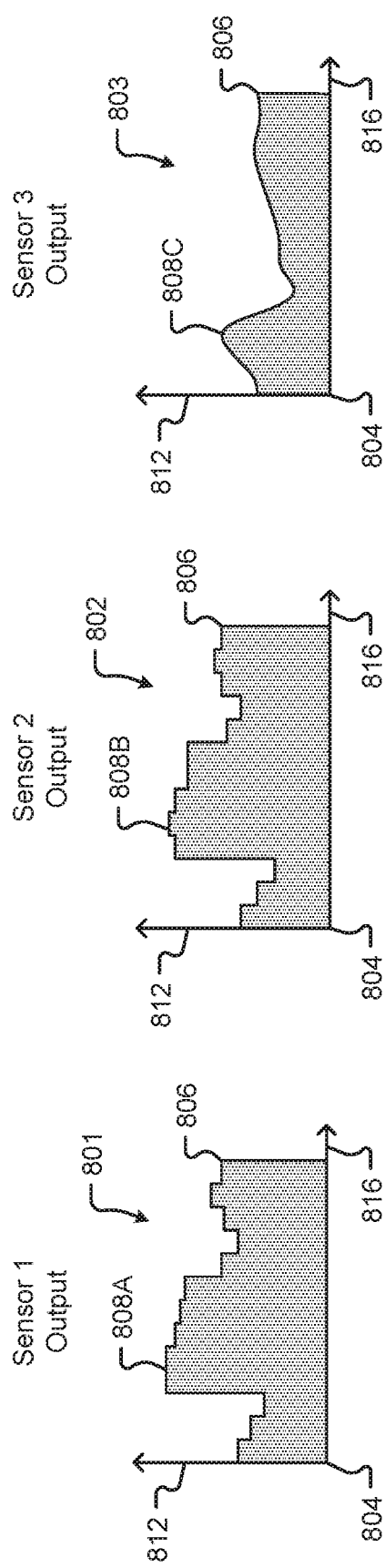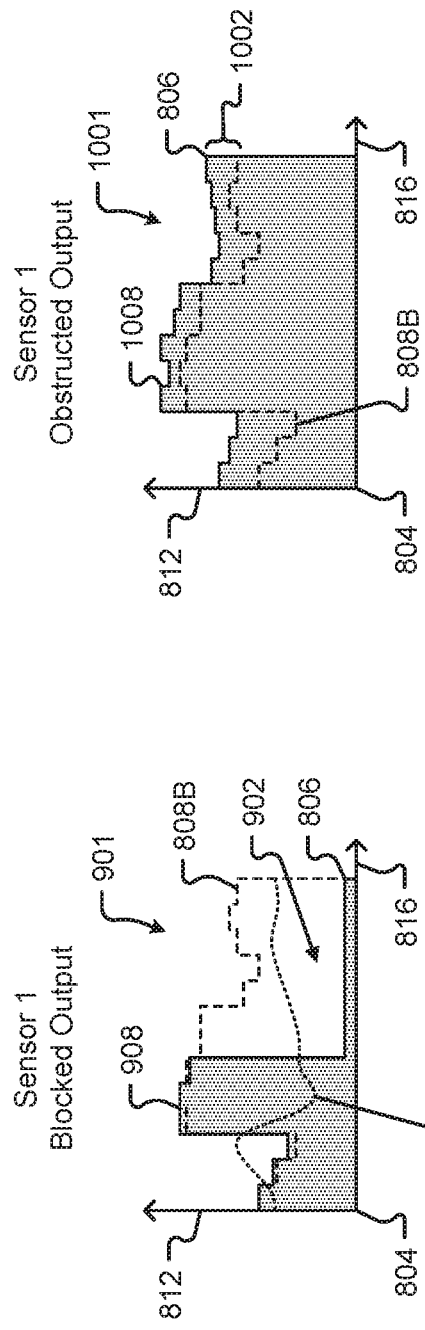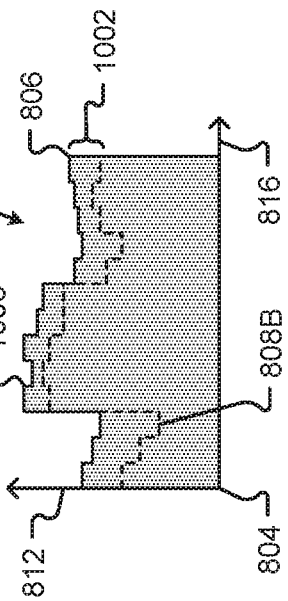

1104A, B, C, D, E: TARGETS

SIMULATED LIDAR DEVICES AND SYSTEMS

FIELD

The present disclosure is generally directed to sensor systems, in particular, toward sensor systems for motor vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

These changes have led to the development of autonomous and semi-autonomous vehicles, which rely on various sensors to gather data about the vehicle environment in order to determine driving operations. For example, there is a recognized need to create detailed visual representations of a vehicle's environment. In this context, LiDAR has been one of the most critical components of higher levels of autonomous vehicle operation. The need for LiDAR sensors is critical to accurately estimate the 3D structure of the environment. Although the LiDAR point cloud is quite sparse, it is still sufficient for most perception problems. But a major challenge with LiDAR systems is that the cost of manufacturing is exorbitantly high, generally a few thousands to a few tens of thousands of dollars, significantly increasing the manufacturing cost of vehicles. In addition, it is further challenging that most systems need more than one LiDAR system to model the 3D scene comprehensively, causing further expense and complexity.

Another common system for procuring 3D information is RADAR. Unlike LiDAR, RADAR points are extremely sparse. However, RADAR systems are much cheaper to manufacture. Furthermore, advancements in RADAR technology have enabled higher point density imaging, which makes them a more affordable though a noisier alternative to LiDAR. Another crucial advantage of RADAR over LiDAR is that RADAR systems have a longer operating distance and can function better in low-visibility conditions such as cloudy weather or nighttime operation. However, RADAR data alone is generally insufficient to generate the types of high-quality 3D images necessary for autonomous vehicle operation.

Accordingly, it would be advantageous for a system to simulate high-quality LiDAR data using less expensive RADAR equipment. The present disclosure relates to a learning-based architecture that learns to generate simulated LiDAR (pseudo-LiDAR or mock LiDAR) data from traditional image data (including night vision camera data) and RADAR point clouds. By combining images, which are rich in textual and semantic information, with the sparse and noisy 3D scene structure procured from RADAR, a deep-learning algorithm can be trained to generate simulated LiDAR data that can be used in real time. In essence, the present disclosure relates to generating point clouds similar to those generated using expensive LiDAR equipment using far less expensive RADAR and image sensors.

Various techniques have been attempted to generate simulated LiDAR data. These include techniques described in the following references, which are incorporated herein:

[1] Wang, Yan, et al. "Pseudo-lidar from visual depth estimation: Bridging the gap in 3d object detection for autonomous driving." *Proceedings of the IEEE Conference on Computer Vision and Pattern Recognition.* 2019.
[2] You, Yurong, et al. "Pseudo-LiDAR++: Accurate Depth for 3D Object Detection in Autonomous Driving." *arXiv preprint arXiv:* 1906.06310 (2019).
[3] Weng, Xinshuo, and Kris Kitani. "Monocular 3D Object Detection with Pseudo-LiDAR Point Cloud." *arXiv preprint arXiv:* 1903.09847 (2019).
[4] Zhou, Tinghui, et al. "Unsupervised learning of depth and ego-motion from video." *Proceedings of the IEEE Conference on Computer Vision and Pattern Recognition.* 2017.
[5] Godard, Clément, Oisin Mac Aodha, and Gabriel J. Brostow. "Unsupervised monocular depth estimation with left-right consistency." *Proceedings of the IEEE Conference on Computer Vision and Pattern Recognition.* 2017.
[6] "Pseudo-LiDAR from Visual Depth Estimation: Bridging the Gap in 3D Object Detection for Autonomous Driving,"

For example, Wang and You try to compute depth maps using stereo images or monocular frames, and Zhou and Godard teaching a similar technique using adjacent frames. In these techniques, a Spatial Transformer Network-based architecture is employed to regress transformation between frames, which is then used to predict depth. Most such methods aim to estimate depth map (a 3D value for each pixel in an image) from the images (primarily using image consistency or stereo setup). The depth maps are subsequently used for generating the LiDAR point cloud. While the pseudo-lidar method of Wang, You and Godard are reasonable, it has three major drawbacks.

First, setting up a stereo-camera with wide baseline (as used by Wang and You) is extremely challenging in a vehicle, as calibrating the stereo camera is burdensome, and absolutely not failsafe for a product. Thus, most of the stereo-camera setup requires an auto-calibration module and other precautionary measures to make the system failsafe, which is cumbersome. For this reason, most camera-based autonomy solution providers avoid using a stereo-camera setup.

On the other hand, methods that use monocular cameras (multiple frames), while exempt from most of the aforementioned problems, are prone to a slightly different set of challenges. Extracting pose information from consecutive pairs is equally challenging, if not more challenging. Any algorithm that performs the task must take into account independently moving objects and possibly model their motion well, alongside modeling the scene's motion. Most of the methods that tackle this problem, such as Zhou and Godard (typically using image consistency), suffer from aforementioned issues and have yet to provide a reliable solution.

Further, when using a monocular camera, the depth estimated is only valid up to an arbitrary scale, and the real scale is unknown to the system. While relative scale and relative Euclidian geometry between the points are preserved, the actual scale remains unknown unless infused externally using sensors. Thus, all algorithms built up on such monocular pipelines will function on arbitrary scale assumption.

SUMMARY

The present disclosure can provide a comprehensive solution to the aforementioned problems. The present disclosure can comprise an algorithm that can both be trained using multi-view/frame setup (stereo or adjacent monocular multi-frame, as well as a single frame. At inference time, the algorithm can require only a single camera frame and RADAR point cloud of the frame to generate comprehensive simulated LiDAR data. The method can regress the point cloud with a real scale of the scene and not in an arbitrary scale. And the method can generate a customizable LiDAR point cloud using a physics-based rendering engine. The physics-based rendering engine of the present disclosure can function like a LiDAR beam, allowing the system to generate simulated point clouds specific to a sensor (like Velodyne (rotating) or Aeva (solid-state)), with more control over number of beams and point density than regular LiDAR point clouds.

BRIEF DESCRIPTION OF THE DRAWINGS

FIG. 8A shows a graphical representation of sensor information detected by a first sensor of the vehicle over time in accordance with embodiments of the present disclosure;

FIG. 8B shows a graphical representation of sensor information detected by a second sensor of the vehicle over time in accordance with embodiments of the present disclosure;

FIG. 8C shows a graphical representation of sensor information detected by a third sensor of the vehicle over time in accordance with embodiments of the present disclosure;

FIG. 9 shows a graphical representation of compared sensor information between sensors of the vehicle in accordance with embodiments of the present disclosure;

FIG. 10 shows a graphical representation of compared sensor information between sensors of the vehicle in accordance with embodiments of the present disclosure;

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
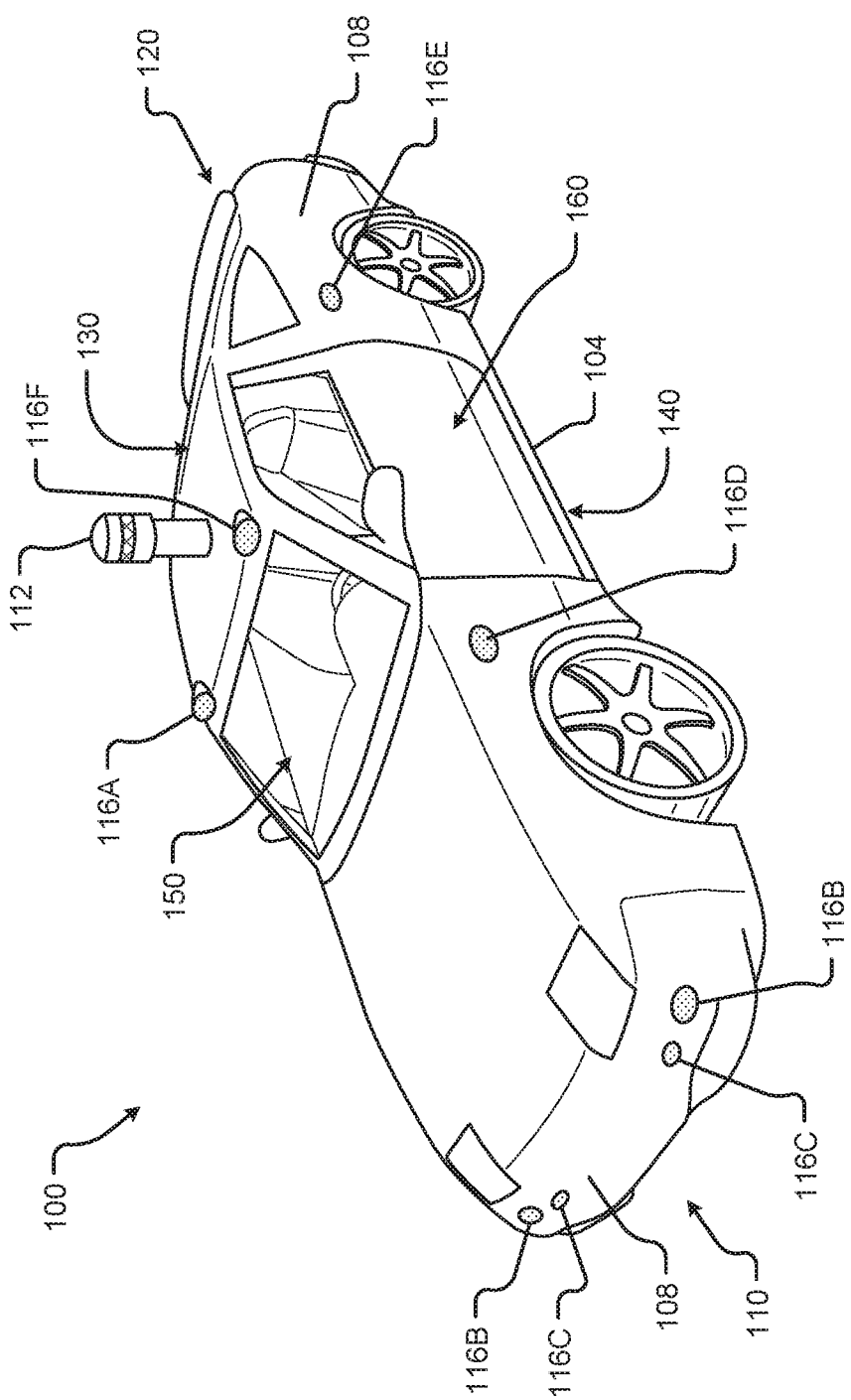
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations.

For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112, an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, or zone of the vehicle 100.

Figure 2:
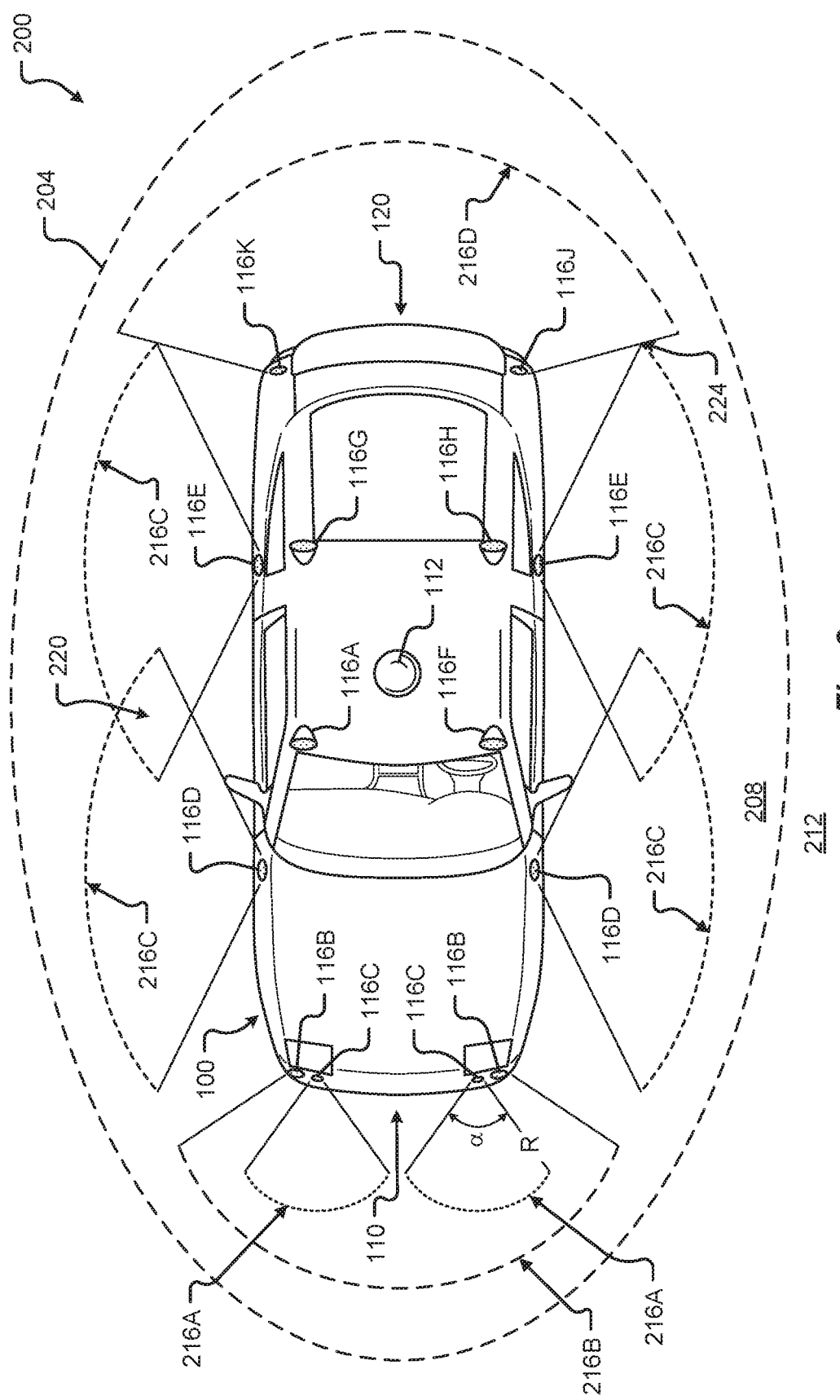
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
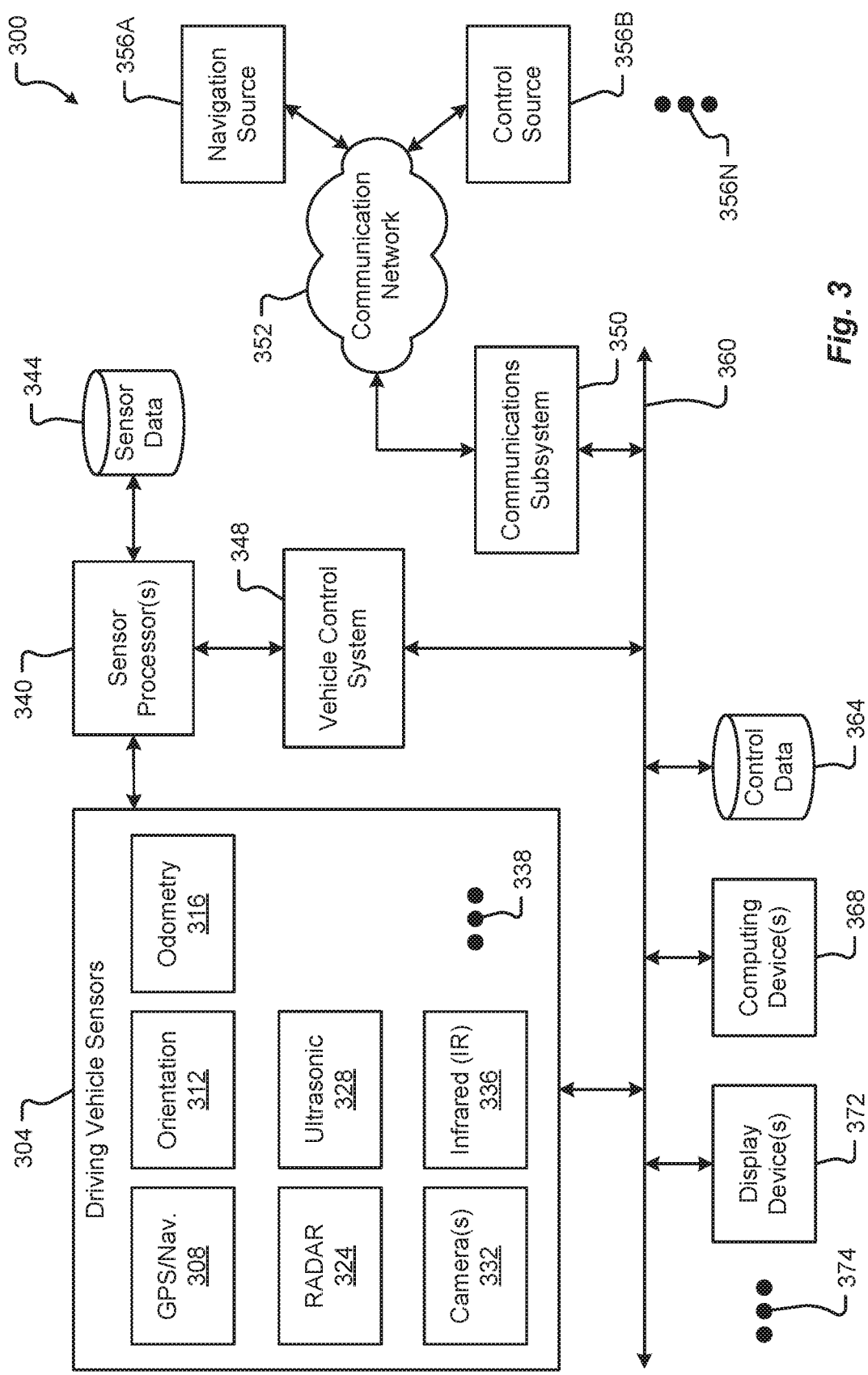
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, sensor cleaning systems 370, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 or 802.11 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning RADAR sensors, Fujitsu Ten Ltd. Automotive Compact 77 GHz 3D Electronic Scan Millimeter Wave RADAR sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
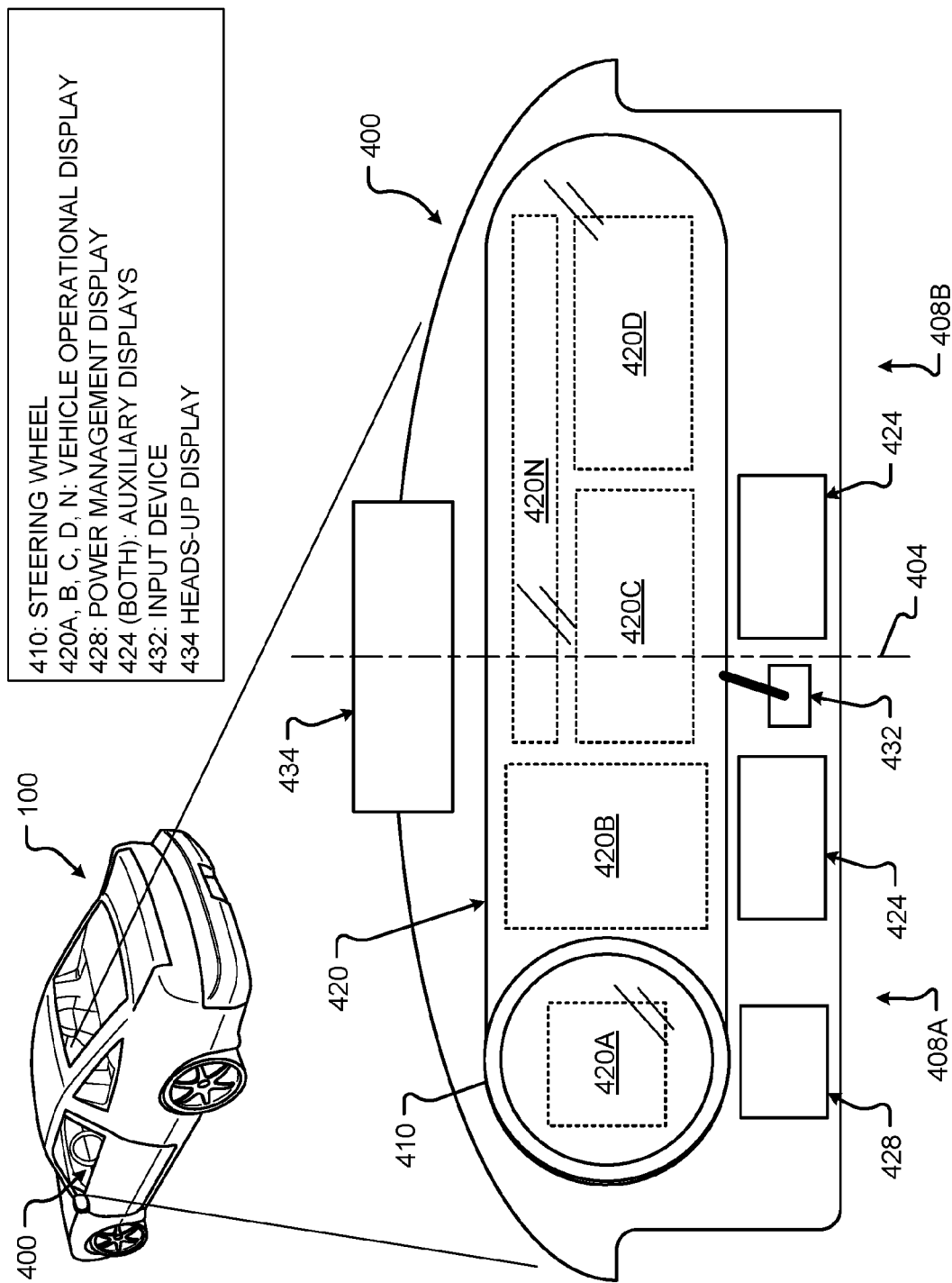
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
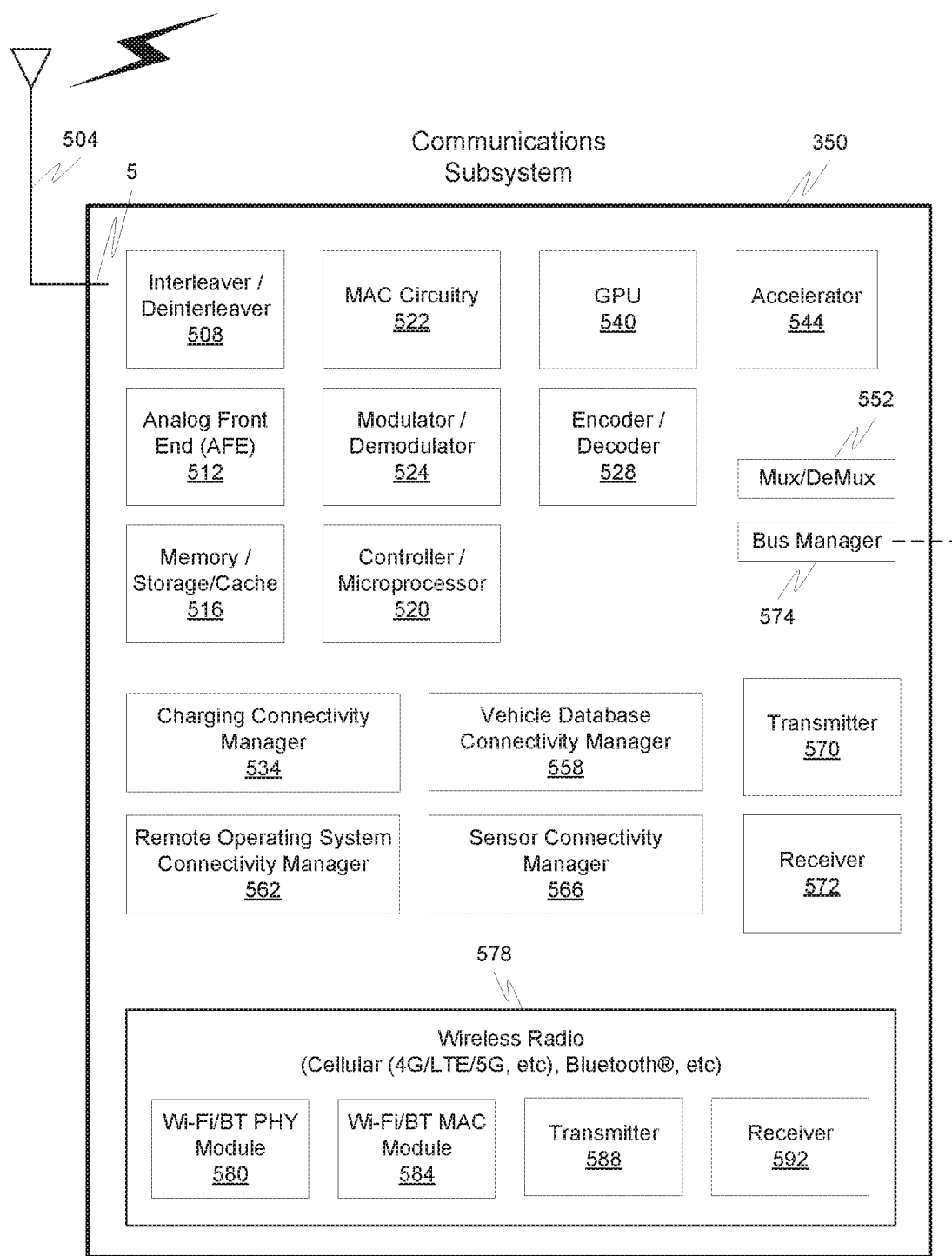
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (interne protocol) address(es), associated with the vehicle and one or other system or subsystems or components therein. These identifiers can be used in conjunction with any one or more of the connectivity managers as discussed herein.

Figure 6:
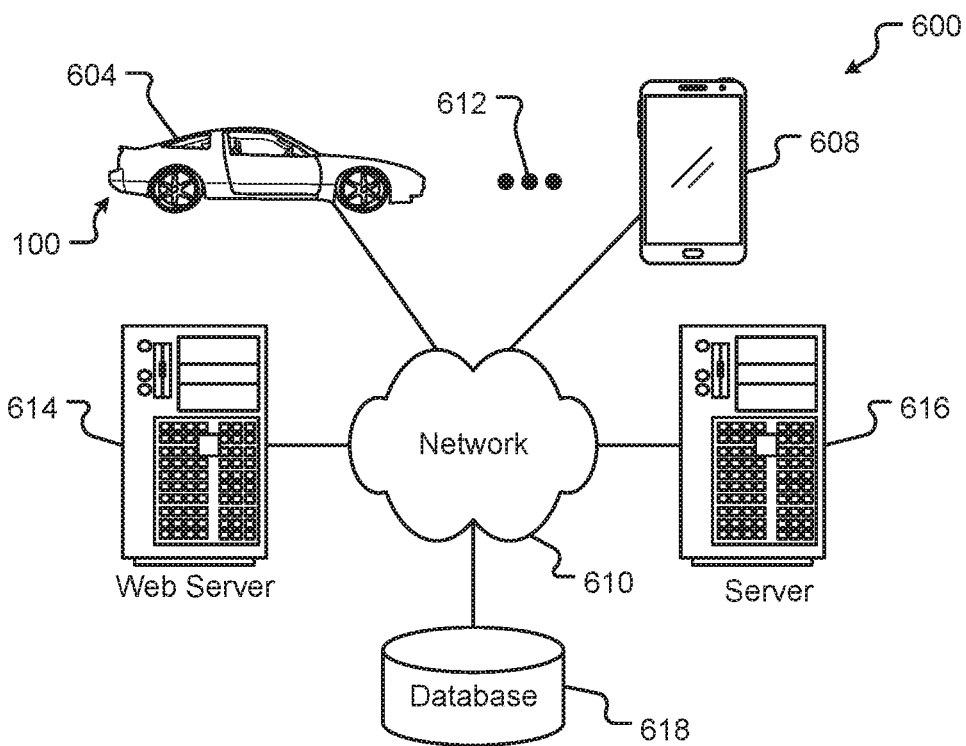
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
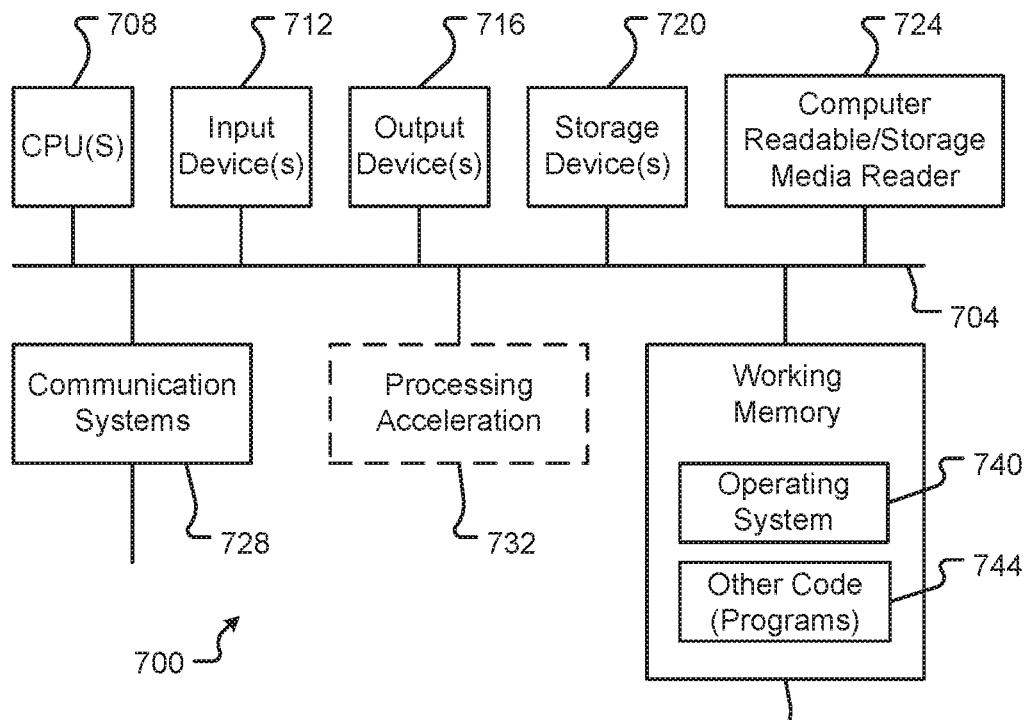
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

FIGS. 8A-8C show graphical representations 801-803 of detected sensor information over time by different sensors (e.g., first, second, and third sensors, etc.) of the vehicle 100. As provided herein, the term sensors may be used to refer to any of the sensors (e.g., the driving vehicle sensors and systems 304, ranging and imaging system 112, sensors 116A-K, etc.), or combinations of sensors, of the vehicle 100. As shown in FIGS. 8A-8C, each graphical representation 801-803 includes a chart having an origin 804 (or first detection point), an end 806 (or last detection point), an output (or number of outputs) over time 808A-C (e.g., waveform), a vertical axis 812 representing an intensity associated with detected sensor information, and a horizontal axis 816 representing the time associated with each output.

The first detection point 804 may correspond to a point in time when the sensor began detecting (e.g., providing detection information, etc.). In some cases, the first detection point 804 may correspond to a first point of an analyzed portion of detected sensor information. In this example, the first detection point 804 may not be the point in time when the sensor began detecting, but may be a point defined or automatically selected by the sensor processors 340 in determining a capability of the sensor for measuring an environment of the vehicle 100.

The last detection point 806 may correspond to a point in time when the sensor stopped detecting (e.g., ceasing to provide detection information). In some cases, the last detection point 806 may correspond to a final point of an analyzed portion of detected sensor information. In this example, the last detection point 806 may not be the point in time when the sensor stopped detecting, but may be a final point defined or automatically selected by the sensor processors 340 in determining a capability of the sensor for measuring an environment of the vehicle 100.

The output over time 808A-C may correspond to an intensity or measurement unit (e.g., range, distance, speed, time of flight, etc.) of the detected sensor information over time. In some embodiments, the output over time 808A-C may include a number of outputs at times within the first detection point 804 and the last detection point 806. As a sensing environment changes over time (e.g., as targets move relative to the sensors) an intensity of the detected sensor information may change. For instance, when a vehicle 100 approaches an intersection and a target in front 110 of the vehicle 100, a RADAR sensor 116B may determine a range to the target by recording an intensity or measurement unit at various times the vehicle 100 is operating. In this example, as the vehicle 100 approaches the target, the range to the target decreases over time. In the event, that the output intensity or measurement unit is a time of flight associated with the emitted and sensed values, the graphical representations 801-803 would show a taller output at a first time (e.g., indicating that it took a long time for the a sensor emission to return back to the sensor) than a height of the output at a second or subsequent time (e.g., when the vehicle 100 and sensors are closer to the target). In the event, that the output intensity or measurement unit is an intensity of a returned sensor signal, the graphical representations 801-803 would show a shorter output at a first time (e.g., indicating that the sensor signal intensity measured from the return signal diminished some amount from the emitted signal intensity because the target was further away at the first time) than a height of the output at a second or subsequent time (e.g., when the vehicle 100 and sensors are closer to the target and the sensor signal intensity measured from the return signal was closer to the emitted signal intensity). In any event, the change in range to a target may be shown as a sensor output that changes in intensity associated with the output over time 808A-C.

FIG. 8A shows a graphical representation 801 of an output over time 808A for a first sensor of the vehicle 100. As shown in FIG. 8A, the output over time 808A may include varying levels of intensity or measurement units along the vertical axis 812 for one or more times in the horizontal axis 816. FIG. 8B shows a graphical representation 802 of an output over time 808B for a second sensor of the vehicle 100. As illustrated in FIGS. 8A-8B, the output over time 808A, 808B for the first and second sensors are substantially similar, if not identical. In some embodiments, the first and second sensors may be the same type of sensor (e.g., imaging and ranging system 112, sensors 116A-K, RADAR 324, ultrasonic 328, camera 332, infrared (IR) 336, and/or other sensor or system 338, etc.). For example, the first and second sensors may be RADAR sensors 324. Whenever the output over time 808A, 808B is substantially similar between sensors of the same type and/or location on a vehicle 100, the sensors may be determined to have the same operating characteristics or abilities. In one embodiment, this similarity may indicate that the sensors are unobstructed by any object.

FIG. 8C shows a graphical representation 803 of an output over time 808C for a third sensor of the vehicle 100. In some embodiments, one or more of the first and/or second sensors may be different from a third type of sensor for the vehicle 100. For instance, the third the same type of sensor may be an imaging sensor 116A, 116F, 332, 336 (e.g., a camera, etc.) of the vehicle 100. Although the output over time 808C is schematically represented as a 2D waveform, it should be appreciated that the visual data need not be so limited. In any event, the output over time 808C for the third sensor output is shown changing (e.g., in intensity and/or measurement unit, as described above) over time.

FIG. 9 shows a graphical representation 901 illustrating an example of overlapped outputs over time 808B, 808C, 908 for three sensors of the vehicle 100 over the same period of time. As described above, the methods and systems described herein may utilize sensor detection information that is similar, if not identical, to that shown in FIGS. 8A-9 (e.g., associated with one or more sensors to detect sensor obstructions including objects that are on, in contact with, or part of sensor surfaces. For example, the graphical representation 901 of FIG. 9 shows an example of an output over time 1008 for a blocked first sensor. The first sensor in FIG. 9 may be determined to be blocked by comparing an output over time 808B for a similar sensor (e.g., second sensor) over a same time period. The output over time 908B for the second sensor is shown in dashed lines overlapping the output over time 908 for the blocked first sensor. In this example graphical representation 901, a difference between the outputs over time 908, 808B may be determined or observed over a nonconforming region 902 of the graph. As shown in FIG. 9, the first and second sensors provided detected sensor information that was similar, if not identical, over a first portion of the period of time (e.g., similar outputs over time 908, 808B, over the portion of time). However, the first sensor provides different detected sensor information (e.g., output over time 908) over a nonconforming region 902 when compared to the second sensor output over time 808B for the same remaining portion of the period of time.

In some embodiments, the difference between the outputs over time 908, 808B may indicate that at least one sensor of the vehicle 100 is obstructed and/or nonfunctional. It is an aspect of the present disclosure that a particular sensor, or sensors, may be identified as the obstructed sensor, or sensors. This identification may include referring to signal characteristics, intensities, measurement values, etc. associated with the sensors of the vehicle 100. In one embodiment, the sensor processors 340 may determine that the detected sensor information from one of the sensors is not changing according to a predicted, or preset, threshold. This lack of change in detected sensor information may indicate that the sensor is completely obstructed, or blocked, at or for an amount of time.

In some embodiments, the sensor processors 340 may determine that the detected sensor information from one of the sensors, when compared to the detected sensor information of at least one other sensor (e.g., a sensor of a different type, a third sensor, etc.) is not changing according to the change characteristics of the at least one other sensor. For instance, the third sensor providing the output over time 808C may be oriented in a similar position on the vehicle 100 (e.g., sensing movement, targets, or a change in environment around the vehicle 100, at a particular side, area, or zone of the vehicle 100, etc.) as the first and/or second sensors having output over time 908, 808B. In this example, the sensor processors 340 may determine that the second sensor output over time 808B and the third sensor output over time 808C, while not necessarily identical, indicate a related change over time in the sensed environment. Additionally or alternatively, the sensor processors 340 may determine that the first sensor output over time 1008 and the third sensor output over time 808C have no relationship, at least over a portion of time (e.g., the nonconforming region 902). In some embodiments, this relationship of change information may be used by the sensor processors 340 to uniquely identify the obstructed sensor from one or more sensors.

FIG. 10 shows a graphical representation 1001 illustrating an example of overlapped outputs over time 1008, 808B for multiple sensors of the vehicle 100 over the same period of time. As described above, the methods and systems described herein may utilize sensor detection information that is similar, if not identical, to that shown in FIGS. 8A-10 (e.g., associated with one or more sensors to detect sensor obstructions including objects that are on, in contact with, or part of sensor surfaces. In one example, a sensor may be obstructed by dirt or detritus and may provide information that is impaired in some way (e.g., not as accurate as a clean sensor, limited range of the sensor, etc.). For example, the graphical representation 1001 of FIG. 10 shows an example of an output over time 1008 for an obstructed first sensor. The first sensor in FIG. 10 may be determined to be obstructed by comparing an output over time 808B for a similar sensor (e.g., second sensor) over a same time period to the output over time 1008 for the first sensor. The output over time 808B for the second sensor is shown in dashed lines overlapping the output over time 1008 for the obstructed first sensor. In this example graphical representation 1001, a difference between the outputs over time 1008, 808B may be determined or observed over a nonconforming region 1002, or measurement variation, of the graph. As shown in FIG. 10, the first and second sensors provided detected sensor information that was similar, if not identical, over the period of time (e.g., similar outputs over time 1008, 808B). However, the first sensor provides a scaled (e.g., diminished, reduced, less accurate, etc.) measurement variation 1002 in the detected sensor information (e.g., output over time 1008) over the period of time when compared to the output over time 808B for the second sensor over the same period of time. In some embodiments, the measurement variation 1002 may be attributed to a proximity of a target to a particular sensor, but when the measurement variation 1002 (e.g., measurement offset, etc.) is substantially consistent across all measurements made over a period of time, the sensor may be determined to be obstructed (at least partially). In FIG. 10, for example, the sensor providing muted intensities or measurement values (e.g., reduced, lower, or diminished values, etc.) may be determined to be the sensor that is obstructed.

Figure 11C:
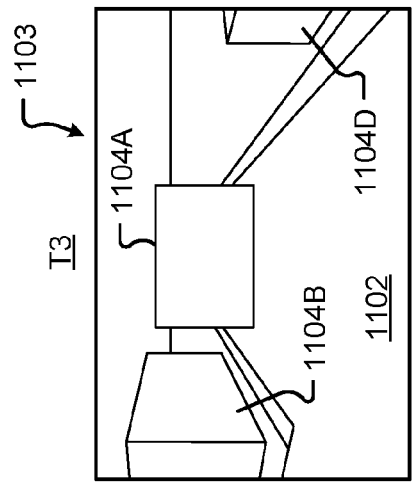
FIG. 11C shows a schematic view of imaging sensor information detected by an imaging system of the vehicle at a third time of travel in accordance with embodiments of the present disclosure.
Figure 11B:
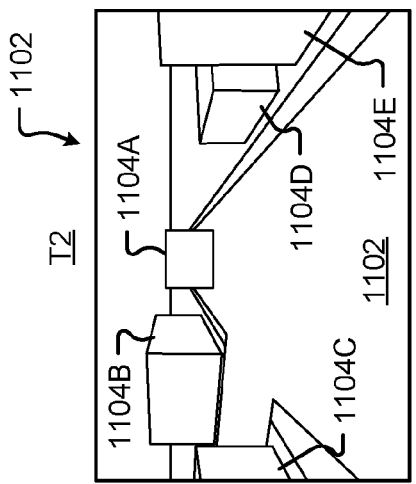
FIG. 11B shows a schematic view of imaging sensor information detected by an imaging system of the vehicle at a second time of travel in accordance with embodiments of the present disclosure.
Figure 11A:
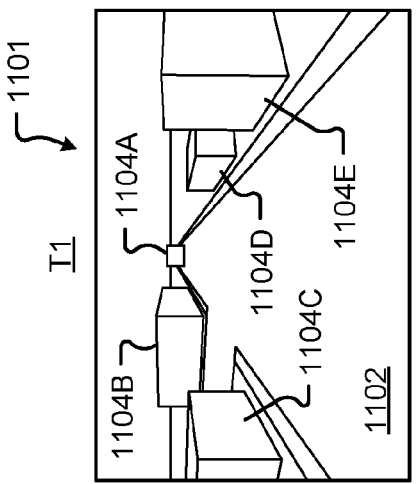
FIG. 11A shows a schematic view of imaging sensor information detected by an imaging system of the vehicle at a first time of travel in accordance with embodiments of the present disclosure.

FIGS. 11A-11C show schematic views of imaging sensor information 1101-1103, detected by at least one imaging system of the vehicle 100, describing a visual environment (e.g., at some point at or around the vehicle 100) that changes over time (T1-T3)(e.g., while the vehicle 100 is driving, etc.). In some embodiments, the imaging system may be one or more of the imaging sensors 116A, 116F, 332, 336 (e.g., a camera, etc.) described above. The schematic views of 11A-11C show computer-generated images 1101-1103 including one or more targets 1104A-E that are detected as changing in shape, size, range, and/or geometry while the vehicle 100 is operating along a path 1106 or roadway.

FIG. 11A shows a schematic view of imaging sensor information 1101 detected by the imaging system of the vehicle 100 at a first time of travel T1 in accordance with embodiments of the present disclosure. In some embodiments, the vehicle 100 may be driving down a street, roadway, or other driving path 1104. As the vehicle 100 is driving, the imaging system may visually detect targets in a sensing area of the imaging system describing (e.g., visually) an environment outside of the vehicle 100. The environment may include a first target 1104A (e.g., another vehicle, a pedestrian, an object, etc.) on the roadway 1106, and/or one or more other targets 1104B-E (e.g., buildings, landmarks, signs, markers, etc.).

As the vehicle 100 moves along the path 1106, visual characteristics associated with the targets 1104A-E may change at a second time T2. FIG. 11B shows a schematic view of imaging sensor information 1102 detected by the imaging system of the vehicle 100 at a second time of travel T2 in accordance with embodiments of the present disclosure. In FIG. 11B, the range to all of the targets 1104A-E has changed. For example, the size and shape of the vehicle target 1104 and the building targets 1104B, 1104D, 1104E have increased in dimension at the second time T2, while building target 1104C is shown moving off-image.

As the vehicle 100 continues to move along the path 1106 at a subsequent time, the visual characteristics associated with the targets 1104A-E may continue to change. In FIG. 11C, a schematic view of imaging sensor information 1103 detected by the imaging system of the vehicle 100 at a third time of travel T3 is shown in accordance with embodiments of the present disclosure. FIG. 11C shows that target information has changed to include a larger shape and size associated with some targets, while other targets have moved completely off-image. For instance, vehicle target 1104 and the building target 1104B have increased in shape and size, while building target 1204D is shown moving off-image and building targets 1104C, 1104E have moved completely off-image. In some embodiments, FIGS. 11A-11C show imaging sensor information changing over time (e.g., T1-T3) for an unobstructed imaging system and/or sensor.

Figure 12:
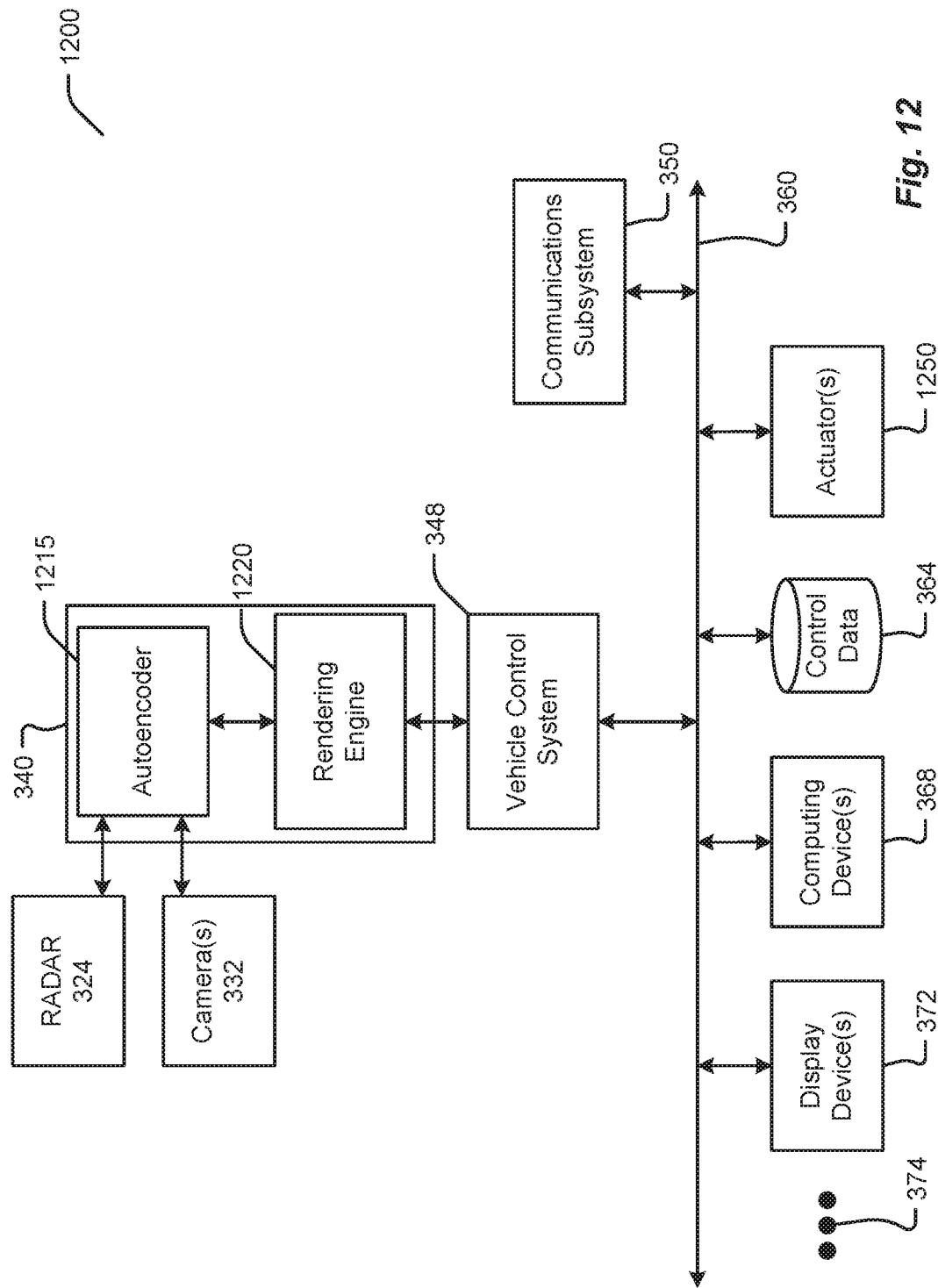
FIG. 12 is a block diagram of an embodiment of a communication environment of the vehicle in accordance with embodiments of the present disclosure.

FIG. 12 is a block diagram of an embodiment of aspects of a communication environment 1200 of the vehicle 100 in accordance with embodiments of the present disclosure that includes a a system for generating simulated LiDAR data. The communication system 1200 may include the components shown in FIG. 3, several of which are omitted for simplicity. However, it will be understood that all components of FIG. 3 can be integrated with or otherwise used in conjunction with the features of FIG. 12.

As in FIG. 3, the driving vehicle sensors may include RADAR 324 and camera 332. The camera 332 may be any type of sensor configured to collect image data, including a night vision camera or an infrared camera. The sensor processor system 340 includes a LiDAR autoencoder 1215, which may comprise a convolutional neural network autoencoder described in more detail below, and a rendering engine 1220, which may comprise a custom LiDAR rendering engine described in more detail below. LiDAR autoencoder 1215 receives data from RADAR 324 and camera 332, and outputs data to rendering engine 1220. Rendering engine 1220 outputs simulated LiDAR data to vehicle control system 348.

The vehicle control system 348 may receive simulated LiDAR data from the rendering engine 1220 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100. In another embodiment, the vehicle control system 348 may calculate modified driving operations and generate control signals based on those modified driving operations to control one more actuators 1250 in order to implement the modified driving operations.

It will be understood that the operation of vehicle control system 300 and modified communication environment 1200 may operate as described above with respect to FIG. 3.

Figure 13:
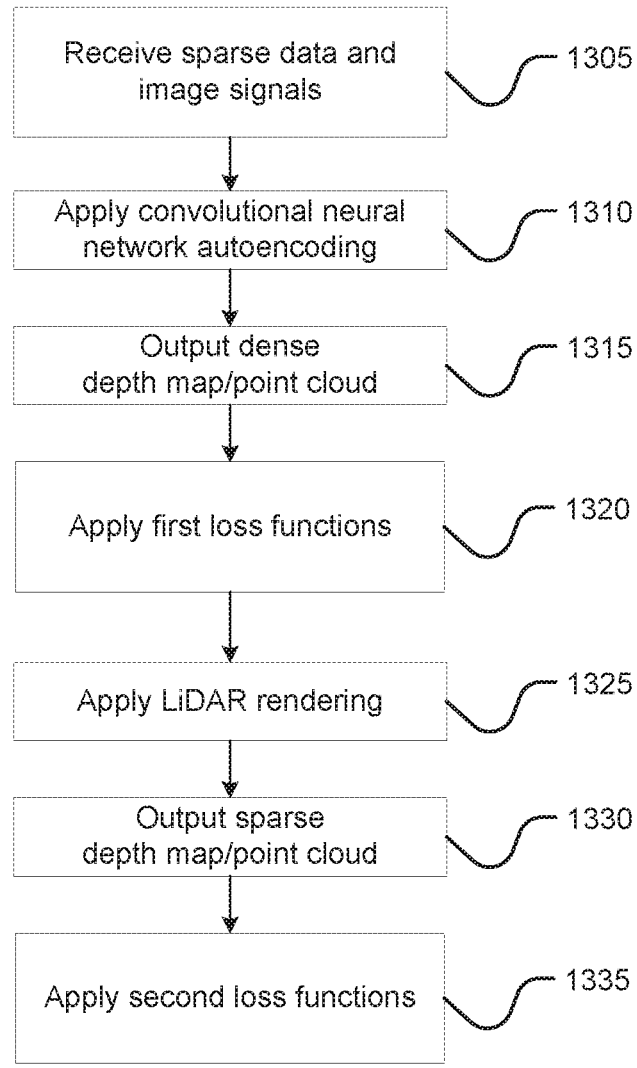
FIG. 13 is a flowchart showing the training method of a simulated LiDAR system in accordance with embodiments of the present disclosure.

FIG. 13 is a flow chart showing the training operation for the LiDAR simulation algorithm. The training method utilizes (1) a LiDAR autoencoder 1215, such as a convolutional neural network autoencoder, that takes image data (I) from camera 332 and RADAR data from RADAR 324 as input and outputs a predicted depth (D); (2) a rendering engine 1220 configured to simulate any type of LiDAR data with any number of beams or a single raster in case of solid state LiDAR systems; and (3) a series of loss functions (with additional networks, not shown, that are used for training) pertaining to minimizing geometric losses and errors between distributions. Thus, the autoencoder 1215 receives sparse RADAR data and image data at step 1305. At step 1310, the autoencoder 1215 applies the convolutional neural network autoencoding operations. At step 1315, the autoencoder 1215 outputs a dense predicted depth map or point cloud. At step 1320, a first set of loss functions are applied to the data. At step 1325, a custom LiDAR rendering engine 1220 renders the dense depth map or point cloud into a sparse depth map or point cloud. At step 1330, the rendering engine 1220 outputs a sparse depth map or point cloud. At step 1335, a second set of loss functions are applied.

Several loss functions may be utilized at step 1320, including the following:

Sum of Squared Error: Given an image I (X×Y×3) and RADAR point cloud R (N×3, (x,y,z)), the autoencoder 1215 outputs a depth map D (X×Y×1). The Sum of Squared loss is the average of sum of squared differences between the nearest z-values of the (x,y) in the RADAR point cloud R and corresponding depth value of D at (x,y) and probability map P signifying confidence of the depth value. The purpose of this loss function is to force the network to learn the real scale of the scene procured from RADAR. Using the RADAR points via a loss function also enables the network to learn to ignore noisy RADAR points, reducing or eliminating the need for a noise-removal module.

Image Consistency Loss: A second autoencoder 1215B (not shown) may be appended with same configuration to that of autoencoder 1215. Autoencoder 1215B takes predicted depth map D (output of autoencoder 1215) as input and outputs a rendered version of Image I, denoted as I'. The cyclic consistency is enforced using a cyclic consistency loss (L2-norm or ordinal loss) $\|I-I'\|_2$. The purpose of this loss function is to ensure that the image and depth map are consistent—smoother regions in the image are smoother in the depth map as well, and vice-versa, and nearby regions share the same depth as the same texture in images (to implicitly counter the sparsity of RADAR point clouds).

Cross Entropy Loss: Similar to the Image Consistency Loss function, the Cross Entropy Loss function operates to ensure that the entropy is relatively the same between the image and the depth map in a local neighborhood. This approach again helps to ensure that the depth maps are consistent across similarly textured regions in images, but in a local neighborhood. This loss function also enforces smoothness constraints into the predicted depth map.

The loss functions applied at step 1335 may include the following:

Adversarial Loss: Once the depth map is rendered into LiDAR data, the algorithm can learn to penalize if the both the generated and actual LiDAR data belong to the same distribution. This is done using a discriminator network G (Generative Adversarial Network architecture) that computes the distance between the underlying distributions (Wasserstein distance) of the generated and actual LiDAR points. Although LiDAR points are used to test the discriminator, this constitutes no supervision using LiDAR, as the present disclosure envisions and enables training the algorithm without supervision using LiDAR. This stage can take any arbitrary LiDAR samples and feed them to the discriminator as ground truth. For example, if the algorithm wishes to generate a simulated Velodyne 64 beam LiDAR image, the rendering engine 1220 is configured to do the same, and any set of preexisting Velodyne 64 beam data can be gathered from any dataset to be used for training adversarial loss.

Semantic Loss: This loss function ensures that the rendered point cloud is not only aesthetic and similar to the real point cloud, but also can function as a real LiDAR point cloud for perception problems. For example, where there is object segmentation annotation in 2D images or object detection annotation in 2D images, the generated LiDAR data can be used to perform object detection and/or point segmentation and use the localization loss or cross-entropy loss (in case of segmentation) for training the simulated LiDAR generation network. This ensures that the simulated LiDAR network learns not just to generate semantically meaningful point clouds but also to generate salient cues for object points that are critical for object detection.

A further description of the autoencoder 1215 will now be provided. The autoencoder 1215 is different from a typical autoencoder, with two convolutional heads (encoders)—one for image data from the camera 332 and other one for RADAR data from RADAR 324. The output is a dense depth map D as discussed above. To create stronger dependency between the autoencoder 1215 and the RADAR point cloud (to ensure RADAR data is exploited well), the autoencoder 1215 uses skip connections between the RADAR convolutional head (encoder) and decoder, and also regresses depth maps at multiple scales (at multiple layers of the decoder) and minimizes the loss between the RADAR data and predicted depth map at each scale, forcing a stronger dependency on the RADAR point cloud.

Autoencoder 1215 may optionally use parallel architecture for iterative regression of depth. The goal of autoencoder 1215 is to densify the RADAR point clouds. Thus, autoencoder 1215 can be iteratively fed by only choosing the points of depth map D whose confidence represented using P are over a certain threshold, and fed to autoencoder 1215 as input at each step. This allows autoencoder 1215 to iteratively densify the RADAR point cloud. However, it should be noted that the technique described herein may be implemented using non-iterative architecture for increased ease of implementation in real-time.

Conversely, autoencoder B (described above) may be a typical autoencoder with depth map D as input and I' as output. D and I are same sized matrices.

Similarly, the discriminator G used to compute adversarial loss is a typical convolutional neural network with convolutional, non-linear and fully connected layers followed by a softmax function that provides a probability of whether the generated and ground truth data belong to the same distribution. This can be enforced via a minmax decision rule or Wasserstein loss.

The training method is also extendable to a multi-frame setting, by adding an additional Image Consistency loss function between two adjacent image frames. In this method, the algorithm works on a "standalone" mode for each image and generates a separate depth map for each instance. Subsequently, the scene transformation can be estimated alongside two independent depth maps, allowing estimation of independently moving 3D points/regions as well. This virtually provides a distance between two 3D points that are moving independently, which can additionally be used as velocity information. This is an advantage over known expensive Multi-View image reconstruction techniques.

Operation of the rendering engine 1220 will now be described. Given a depth map D and optical center O (x,y,z), the rendering engine 1220 simulates LiDAR by algorithmically generating a LiDAR point cloud based on the input data and configuration of the sensors. For example, to simulate a Velodyne 64 orientation and inclination, the engine 1220 places 64 different optical centers above and below the sensors' optical center, generates a beam for 360 degrees, and picks the corresponding depth point for each projection of the beam for each of 64 optical centers. Similarly, for any solid-state sensor like Aeva, the engine 1220 performs raster rendering to generate points instead of 360-degree beams.

In addition, the algorithm can operate directly using the estimated depth map without the need for a rendering engine, but the rendering engine provides us a way to mimic LiDAR data with the same level of sparsity and of similar nature to actual LiDAR. Using the rendering engine is also necessary for the adversarial loss function as the ground truth and generated data must be of the same distribution, but otherwise the depth map generated is equally if not better to be used in most perception pipelines.

Figure 14:
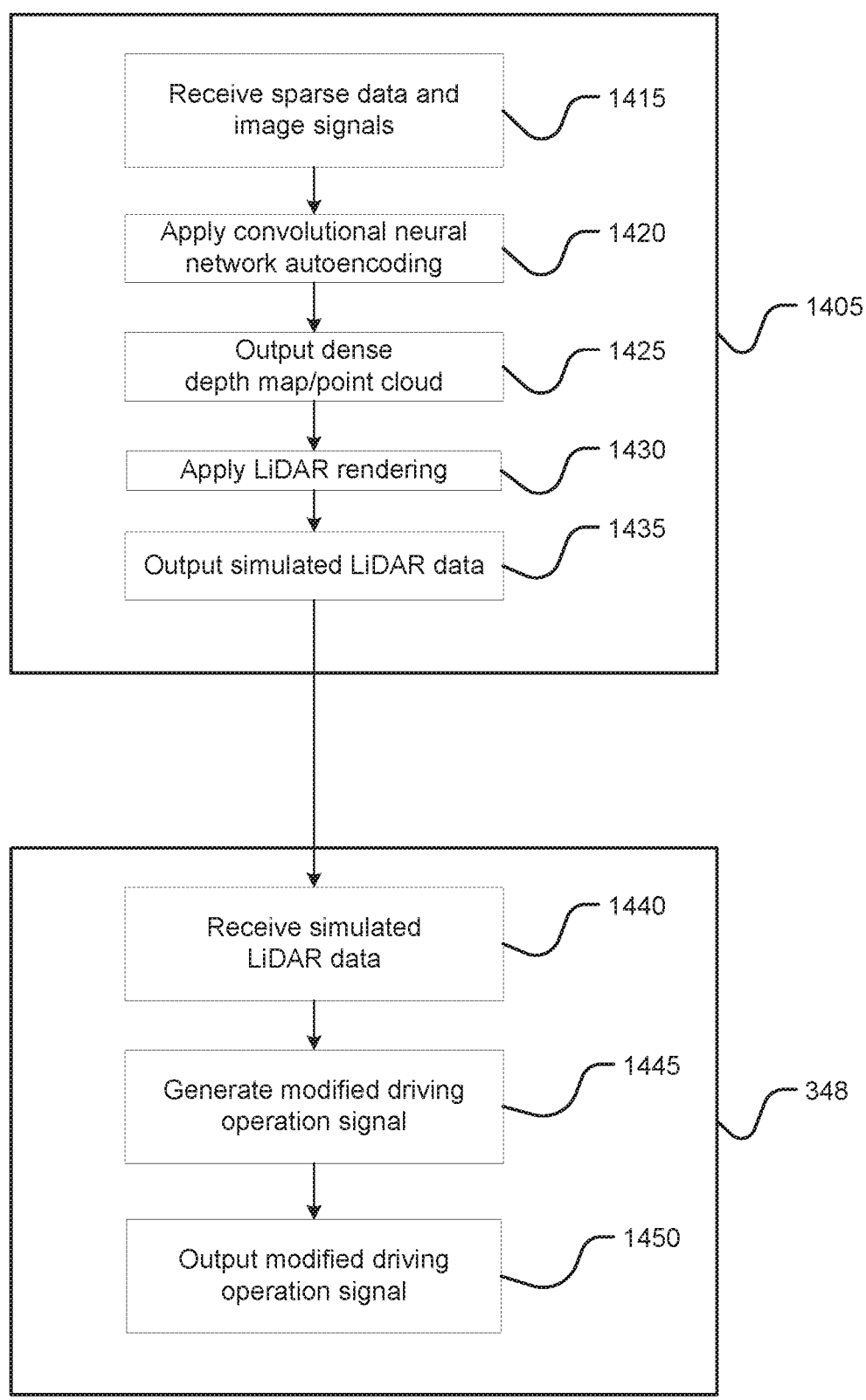
FIG. 14 is a flowchart showing the operation of a vehicle in accordance with embodiments of the present disclosure.

FIG. 14 is a flow chart showing the operation of the LiDAR simulation system 1405 with vehicle control system 348 in the field, after the algorithm has been trained. LiDAR simulation system 1405 performs the same steps as shown in FIG. 13, except that loss functions are now omitted because the algorithm is fully trained. Thus, the autoencoder 1215 receives sparse RADAR data from RADAR 324 and image data from camera 332 at step 1415. At step 1420, the autoencoder 1215 applies the convolutional neural network autoencoding operations. At step 1425, the autoencoder 1215 outputs a dense predicted depth map or point cloud. At step 1430, a custom LiDAR rendering engine 1220 renders the dense depth map or point cloud into a sparse depth map or point cloud. At step 1435, the rendering engine 1220 outputs a sparse depth map or point cloud.

The simulated LiDAR data (e.g., the sparse depth map or point cloud) is outputted to vehicle control system 348, which receives the data at step 1440. At step 1445, vehicle control system 348 determines and generates a modified driving operation signal based on the received simulated LiDAR data. At step 1450, vehicle control system 348 outputs the modified driving operation signal to operate the vehicle, e.g. by controlling one more actuators in order to implement the generated modified driving operation signal. The vehicle control system operates as described above with respect to FIG. 3 and FIG. 12.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system comprising: a first sensor configured to sense sparse signals; a second sensor configured to sense image signals; an encoder coupled to said first sensor and said second sensor and configured to receive at least one of said sparse signals and at least one of said image signals; a processor coupled to said encoder; and a computer readable medium coupled to said processor and comprising instructions stored thereon that cause the processor to generate a simulated LiDAR output based on said at least one of said sparse signals and said at least one of said image signals.

Aspects of the above system include wherein said first sensor comprises a RADAR array, and said sparse signals comprise RADAR signals; wherein said second sensor comprises a camera; wherein said at least one of said sparse signals consists of a RADAR point cloud; wherein said at least one of said image signals consists of a single frame; wherein said simulated LiDAR output comprises a simulated LiDAR point cloud; and wherein said simulated LiDAR output comprises a depth map.

Embodiments include a vehicle comprising: a simulated LiDAR imaging system comprising: a first sensor configured to sense sparse signals; a second sensor configured to sense image signals; an encoder coupled to said first sensor and said second sensor and configured to receive at least one of said sparse signals and at least one of said image signals; a first processor coupled to said encoder; and a first computer readable medium coupled to said first processor and comprising instructions stored thereon that cause said first processor to generate a simulated LiDAR output based on said at least one of said sparse signals and said at least one of said image signals; a second processor configured to receive said simulated LiDAR output; and a second computer readable medium coupled to said second processor and comprising instructions stored thereon that cause said second processor to perform steps comprising: generating at least one modified driving operation signal in response to said simulated LiDAR image; and communicating said modified driving operation signal to one or more actuators to control one or more vehicle components to perform a selected operation in response to said modified driving operation signal.

Aspects of the above vehicle include: wherein said first sensor comprises a RADAR array, and said sparse signals comprise RADAR signals; wherein said second sensor comprises a camera; wherein said at least one of said sparse signals consists of a RADAR point cloud; wherein said at least one of said image signals consists of a single frame; wherein said simulated LiDAR output comprises a simulated LiDAR point cloud; and wherein said simulated LiDAR output comprises a depth map.

Embodiments include a method comprising: sensing, by a first sensor, at least one sparse signal; sensing, by a second sensor, at least one image signal; receiving, by an encoder coupled to said first sensor and said second sensor, said at least one sparse signal and said at least one image signal; and generating, by a processor, a simulated LiDAR output based on said at least one sparse signal and said at least one image signal.

Aspects of the above method include wherein said first sensor comprises a RADAR array, and said sparse signals comprise RADAR signals; wherein said at least one of said sparse signals consists of a RADAR point cloud; wherein said at least one of said image signals consists of a single frame; wherein said simulated LiDAR output comprises a simulated LiDAR point cloud; and wherein said simulated LiDAR output comprises a depth map.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A system comprising:
a first sensor configured to sense data signals;
a second sensor configured to sense image signals;
an encoder, coupled to said first sensor and said second sensor, to receive at least one of said data signals and at least one of said image signals, said encoder comprising a convolutional neural network autoencoder;
a rendering engine coupled to said encoder;
a processor coupled to said encoder and to said rendering engine; and
a computer readable medium coupled to said processor and comprising instructions stored thereon that cause the processor to perform at least the following operations:
applying, by said encoder, convolutional neural network autoencoding operations;
outputting, by said encoder, at least one of a predicted point cloud and a predicted depth map based on said at least one of said data signals and said at least one of said image signals;
rendering, by said rendering engine, said at least one of a predicted point cloud and a predicted depth map into at least one of a second point cloud and a second depth map of lower density than said predicted point cloud; and
generating, by said rendering engine, based on said at least one of a second point cloud and a second depth map, a simulated LiDAR output capable of being used in place of a non-simulated LiDAR output.

2. The system of claim 1, wherein said first sensor comprises a RADAR array, and said data signals comprise RADAR signals.

3. The system of claim 1, wherein said second sensor comprises a camera.

4. The system of claim 1, wherein said at least one of said data signals consists of a RADAR point cloud.

5. The system of claim 1, wherein said at least one of said image signals consists of a single frame.

6. The system of claim 1, wherein said simulated LiDAR output comprises a simulated LiDAR point cloud.

7. The system of claim 1, wherein said simulated LiDAR output comprises a depth map.

8. A vehicle comprising:
a simulated LiDAR imaging system comprising:
a first sensor configured to sense data signals;
a second sensor configured to sense image signals;
an encoder, coupled to said first sensor and to said second sensor, configured to receive at least one of said data signals and at least one of said image signals, said encoder comprising a convolutional neural network autoencoder;

a rendering engine coupled to said encoder;
a first processor coupled to said encoder and to said rendering engine; and
a first computer readable medium coupled to said first processor and comprising instructions stored thereon that cause said first processor to perform at least the following operations:
  applying, by said encoder, convolutional neural network autoencoding operations;
  outputting, by said encoder, at least one of a predicted point cloud and a predicted depth map based on said at least one of said data signals and said at least one of said image signals;
  rendering, by said rendering engine, said at least one of a predicted point cloud and a predicted depth map into at least one of a second point cloud and a second depth map of lower density than said predicted point cloud; and
  generating, by said rendering engine, based on said at least one of a second point cloud and a second depth map, a simulated LiDAR output capable of being used in place of a non-simulated LiDAR output;
a second processor that receives said simulated LiDAR output; and
a second computer readable medium coupled to said second processor and comprising instructions stored thereon that cause said second processor to:
  generate at least one modified driving operation signal in response to said simulated LiDAR output; and
  communicate said modified driving operation signal to one or more actuators to control one or more vehicle components to perform a selected operation in response to said modified driving operation signal.

9. The vehicle of claim 8, wherein said first sensor comprises a RADAR array, and said data signals comprise RADAR signals.

10. The vehicle of claim 8, wherein said second sensor comprises a camera.

11. The vehicle of claim 8, wherein said at least one of said data signals consists of a RADAR point cloud.

12. The vehicle of claim 8, wherein said at least one of said image signals consists of a single frame.

13. The vehicle of claim 8, wherein said simulated LiDAR output comprises a simulated LiDAR point cloud.

14. The vehicle of claim 8, wherein said simulated LiDAR output comprises a depth map.

15. A method comprising:
  sensing, by a first sensor, at least one data signal;
  sensing, by a second sensor, at least one image signal;
  receiving, by an encoder coupled to said first sensor and said second sensor, said at least one data signal and said at least one image signal, said encoder comprising a convolutional neural network autoencoder;
  applying, by said encoder, convolutional neural network autoencoding operations;
  outputting, by said encoder, at least one of a predicted point cloud and a predicted depth map based on said at least one of said data signal and said at least one of said image signal;
  rendering, by a rendering engine, said at least one of a predicted point cloud and a predicted depth map into at least one of a second point cloud and a second depth map of lower density than said predicted point cloud; and
  generating, by said rendering engine, based on said at least one of a second point cloud and a second depth map, a simulated LiDAR output capable of being used in place of a non-simulated LiDAR output.

16. The method of claim 15, wherein said first sensor comprises a RADAR array, and said at least one data signal comprise RADAR signals.

17. The method of claim 15, wherein said at least one data signal consists of a RADAR point cloud.

18. The method of claim 15, wherein said at least one image signal consists of a single frame.

19. The method of claim 15, wherein said simulated LiDAR output comprises a simulated LiDAR point cloud.

20. The method of claim 15, wherein said simulated LiDAR output comprises a depth map.

* * * * *